Dec. 15, 1959 G. A. FEDDE 2,917,576
REDUCTION OF COLOR CONTAMINATION BY PILOT OSCILLATOR IN BEAM REGISTRATION SYSTEM
Filed April 9, 1957
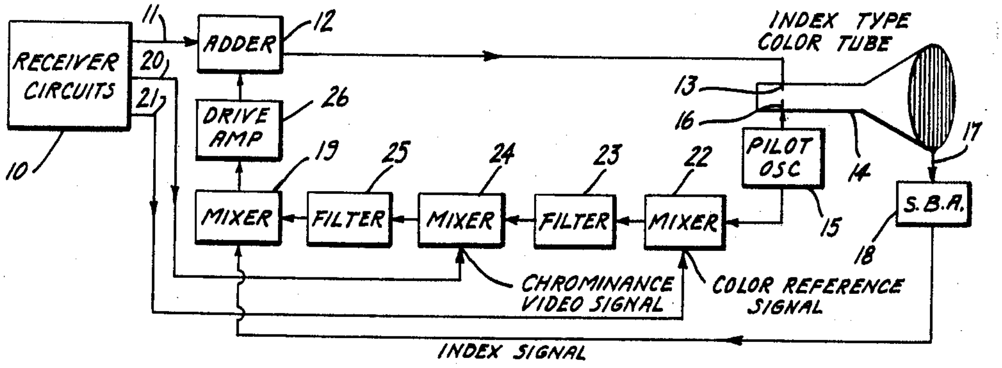
FIG. 1. (PRIOR ART)
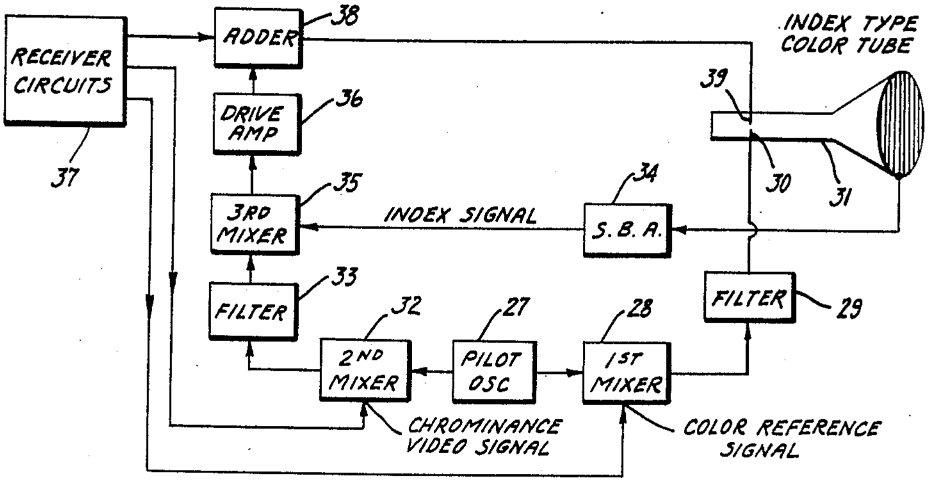
FIG. 2. (THIS INVENTION)
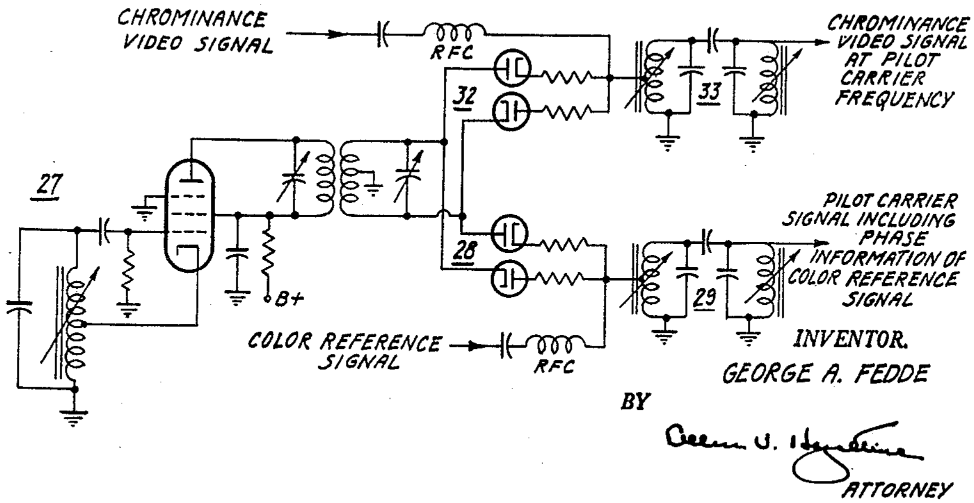
INVENTOR.
GEORGE A. FEDDE
BY
[signature]
ATTORNEY United States Patent Office 2,917,576
Patented Dec. 15, 1959

2,917,576

REDUCTION OF COLOR CONTAMINATION BY PILOT OSCILLATOR IN BEAM REGISTRATION SYSTEM

George A. Fedde, Hatboro, Pa., assignor to Philco Corporation, Philadelphia, Pa., a corporation of Pennsylvania Application April 9, 1957, Serial No. 651,698

11 Claims. (Cl. 178—5.4)

This invention relates to color television receivers of the type employing a single index-type cathode ray tube which, in addition to producing the color image, produces an index signal indicative of instantaneous position of the image-producing or "writing" beam, such signal being utilized to effect proper coordination at each instant between intensity modulation and position of said beam, which is essential for proper color rendition.

More particularly, this invention relates to color television receivers of this type wherein a so-called pilot carrier system is employed and wherein heterodyne mixers are employed to derive a color writing signal whose frequency, amplitude, and phase are correct for proper color rendition. Receivers of this type are now well known in the art, and therefore the following brief discussion thereof will suffice for the purpose of this specification.

First, with respect to the cathode ray tube, the screen thereof comprises successive groups of light-emissive elements, the elements of each group being emissive of light of different primary colors in response to electron impingement. The screen of the cathode ray tube further comprises index elements positionally related to said groups of colored light-emissive elements and adapted to produce the index signal in response to electron impingement. The index elements may produce the index signal by secondary electron emission, by light emission, or in any other suitable manner. Preferably the colored light-emissive elements are in the form of stripes arranged in triplets, each triplet comprising phosphor stripes emissive of light of three primary colors such as red, green and blue. The index elements are also preferably in the form of stripes positionally related to said triplets. Assuming, for example, that the index signal is generated by secondary electron emission, the index stripes may be composed of a material, such as magnesium oxide, which is emissive of secondary electrons in response to impingement of primary electrons.

Next with respect to the reproduction of the color image, it should be borne in mind that the now-standard composite color television signal comprises the luminance video signal, the chrominance video signal which is transmitted as amplitude and phase modulation of a subcarrier, and the color reference signal consisting of bursts of the unmodulated subcarrier. In a receiver of the type here involved, the writing frequency, usually about 6 mc., is the nominal rate at which the writing beam traverses the color triplets, i.e. the number of triplets traversed per second. For proper reproduction of the color image, it is necessary to derive, from the color signal components and the index signal, a color writing signal having the required nominal frequency, about 6 mc., and having the proper phase and amplitude as determined by the chrominance video signal and the color reference signal. Moreover, the use of a pilot carrier is desirable in the interest of avoidance of video contamination of the index signal. In the same interest, it is desirable to employ a dual beam cathode ray tube, one beam being the writing beam, and the other being the pilot or index beam.

In a system of this character, a pilot oscillator is employed for two purposes—(1) to raise the frequency of the index signal, while preserving the necessary phase information, to a value such that it is removed from the writing frequency and harmonics thereof, and (2) to effect the frequency conversion which is necessary in the derivation of the color writing signal.

Prior to this invention, the pilot oscillator signal was applied directly to intensity modulate the pilot beam, and the color writing signal was derived by an arrangement which involved successive heterodyne mixing actions to inject the information of the chrominance video signal and the color preference signal. In the prior arrangement most commonly employed, the pilot oscillator signal, in addition to being applied directly to modulate the intensity of the pilot beam, was also successively mixed with the chrominance video signal and the color reference signal, the appropriate sidebands being selected by filters to yield a resultant signal at the pilot oscillator frequency modulated with the color phase and amplitude information. The derived index signal, at a frequency equal to the pilot oscillator frequency plus or minus the writing frequency, was mixed with the aforementioned resultant signal to produce the desired color writing signal. This method of producing the color writing signal was not entirely satisfactory, as it imposed a stringent filtering requirement to prevent the pilot oscillator signal from causing color contamination, as explained more fully hereinafter.

The principal object of the present invention is to overcome this objection and to provide an improved arrangement or system for producing the color writing signal.

In accordance with this invention, the pilot oscillator is assigned a frequency which differs from the desired pilot carrier frequency by an amount equal to the frequency of the color reference signal, and the latter signal is mixed with the oscillator signal to produce the pilot carrier frequency. The pilot oscillator signal is also mixed with the chrominance video signal, and a resultant signal at the pilot carrier frequency is mixed with the derived index signal to produce the color writing signal. This arrangement avoids the use of two mixers in series to inject the information of the color reference signal and the chrominance video signal, and instead the information of these signals is injected through two parallel mixers.

The invention may be fully understood from the following detailed description with reference to the accompanying drawings, wherein Fig. 1 is a simple block diagram of a color television receiver embodying the arrangement commonly employed prior to the present invention;

Fig. 2 is a block diagram of a color television receiver embodying the arrangement according to the present invention; and Fig. 3 is a circuit diagram of the principal components of the system of Fig. 2 as employed in one color television receiver.

It is believed that the present invention may best be understood by first considering in further detail the aforementioned prior arrangement and its objections. Accordingly, that arrangement is illustrated in Fig. 1 to enable a clear understanding of the problem which was solved by the present invention.

In Fig. 1, block 10 represents the conventional receiver circuits by which the individual components of the received composite color television signal are derived. The luminance component is derived at the output connection 11 and is supplied through adder 12 to the control electrode 13 of the cathode ray tube 14. The latter is of the type hereinbefore mentioned, and preferably it is of the dual beam type, the control electrode 13 serving to control the intensity of the writing beam.

The pilot oscillator 15 is connected directly to the control electrode 16 so as to vary the intensity of the pilot or index beam at the relatively high frequency of the pilot oscillator. As a result of the scanning of the index elements by the pilot beam, there appear at connection 17 modulation products which include sideband signals representing the sum and difference of the pilot carrier frequency and the rate of scanning of the index elements. Each sideband signal has a nominal frequency determined by the normal rate of scanning, and its frequency varies whenever the scanning rate varies. One of the sideband signals is selected in the sideband amplifier 18 and is supplied to the heterodyne mixer 19.

The chrominance video signal and the color reference signal are separated from the received composite signal by conventional means within the circuits of block 10. The chrominance video signal is derived at output connection 20. The color reference signal, which originally consists of bursts, is converted to a continuous signal in the usual way by synchronizing a reference oscillator with the bursts. The converted color reference signal is derived at output connection 21. The pilot oscillator signal and the color reference signal are supplied to the heterodyne mixer 22, and one of the heterodyne components (upper or lower) is selected in filter 23. The output of this filter and the chrominance video signal are supplied to the heterodyne mixer 24, and the sideband (lower or upper) other than the heterodyne component selected in filter 23 is selected in filter 25. Thus if the lower heterodyne component were selected in filter 23, the upper sideband would be selected in filter 25. The output of filter 25 contains all of the necessary color information but its frequency is much higher than the writing frequency. Therefore the output of filter 25 and the output of the sideband amplifier 18 are supplied to the heterodyne mixer 19 to effect the necessary frequency conversion. The proper sideband signal is selected by the drive amplifier 26 and is supplied to adder 12 and thence to the control electrode 13.

By way of example, suppose that the frequency of the pilot oscillator 15 is 44 mc. and that the normal rate of scanning the index elements is 6 mc. which is also the writing frequency. Assume further that the upper sideband (50 mc.) of the pilot carrier is selected in the sideband amplifier 18. For convenience, it may be assumed that the color repetition frequency is 3.6 mc., this then being the frequency of the color reference signal and also being the center frequency of the chrominance video signal. Then the heterodyne signal selected by filter 23 will have a frequency of either 47.6 mc. or 40.4 mc. Assume that the lower frequency is selected. Then the filter 25 will select the upper sideband in the output of mixer 24, which sideband will have a nominal frequency of 44 mc. The lower sideband in the output of the mixer 19, i.e. the color writing signal, will have a nominal frequency of 6 mc. In other words, the color writing signal is finally derived by mixing a 44 mc. signal containing all of the color information with the 50 mc. indexing signal.

Now it will be seen that the arrangement of Fig. 1 requires successive and reverse small frequency conversions of the 44 mc. signal from the pilot oscillator 15 to inject successively the color synchronizing information and the color picture information. Thus in the mixer 22, the 44 mc. signal is converted to 40.4 mc., and in the mixer 24, the signal is converted back to 44 mc. Since the 44 mc. output of filter 25 contains the color information, it is important that the 44 mc. signal from the pilot oscillator not be permitted to pass through the filter system. Otherwise the color signal output of filter 25 would be contaminated. Therefore the filter 23 must discriminate sharply against 44 mc. but must pass 40.4 mc. which is very close to 44 mc. In practice it was found that such an arrangement imposed such a stringent filtering requirement as to necessitate the use of very expensive filters. There was thus presented the problem which was solved by the present invention.

This invention is based upon the concept of utilizing the color reference signal as a means to enable offset of the pilot oscillator frequency from the frequency of the signal containing the color picture information, thereby avoiding the aforementioned stringent filtering requirement. It was reasoned that since the color reference signal does not contain picture information but is simply a phase reference, the phase information of this signal could be injected into the index signal and at the same time the color reference signal could be utilized as an offset for the pilot oscillator frequency.

Referring now to Fig. 2, there is shown an arrangement in accordance with this invention. In this system, the pilot oscillator 27 is assigned a frequency which differs from the desired pilot carrier frequency by an amount equal to the frequency of the color reference signal, and the oscillator output and the color reference signal are supplied to the heterodyne mixer 28. The desired pilot carrier frequency is selected by filter 29 and is supplied to the pilot grid 30 of the cathode ray tube 31.

Concurrently, the output of oscillator 27 and the chrominance video signal are supplied to the heterodyne mixer 32, and the filter 33 selects the sideband whose nominal frequency corresponds to the pilot carrier frequency.

The output of filter 33 and the output of the sideband amplifier 34 are supplied to the heterodyne mixer 35, and the color writing signal is selected by the drive amplifier 36. In the illustrated embodiment, as in Fig. 1, both the luminance video signal derived from receiver circuits 37 and the color writing signal are supplied through adder 38 to the control grid 39 of the cathode ray tube 31.

By way of example, assume again that the desired pilot carrier frequency is 44 mc., and that the color repetition frequency is 3.6 mc. Suppose further that the frequency assigned to the pilot oscillator is 40.4 mc., i.e. the difference between 44 mc. and 3.6 mc. Then the filter 29 selects the upper heterodyne component, i.e. 44 mc., as the pilot carrier frequency. Filter 33 concurrently selects the upper sideband in the output of mixer 32, said sideband having a nominal frequency of 44 mc. The beating of this sideband signal with the 50 mc. signal from the sideband amplifier 34 produces the 6 mc. color writing signal.

Now it will be seen that in this system the frequency of the pilot oscillator, e.g. 40.4 mc., is different from the 44 mc. output of filter 33 which contains the picture information. If the 40.4 mc. oscillator signal should pass through to the output of filter 33, it would beat with the 50 mc. signal from amplifier 34 and would produce a 9.6 mc. signal. However this signal will be attenuated in the drive amplifier 36 in favor of the 6 mc. writing signal. Therefore, the filter 33 need not have as much attenuation to the oscillator signal as is required in the filter system of Fig. 1. Thus the system provided by this invention eliminates the stringent filtering requirement of the prior system of Fig. 1.

A further advantage of the system provided by this invention is that where the receiver is adapted to receive monochrome signals by the provision of "color killer" means, the pilot carrier is automatically removed from the picture tube whenever the "color killer" means is rendered operative and disables the reference oscillator. Thus in the system of Fig. 2, in the absence of the color reference signal, there is no pilot carrier applied to the picture tube. However, in the system of Fig. 1, the pilot carrier is applied to the picture tube irrespective of the presence or absence of the color reference signal.

Fig. 3 shows, by way of example, the specific character of the principal components of the system of Fig. 2 as employed in one color television receiver. These components are identified in Fig. 3 by the same reference characters as in Fig. 2. Since these components are conventional devices, detailed description thereof is deemed to be unnecessary.

While the invention has been disclosed herein with particular reference to one embodiment, it is to be understood that the invention is not limited thereto but contemplates such modifications and other embodiments as may occur to those skilled in the art.

I claim:

1. In a color television receiver adapted to receive a color television signal from which are derived a color reference signal and a chrominance video signal having the same frequency, a cathode ray tube including elements successively impinged by a writing beam to produce a color image and also including means for producing an index signal indicative of instantaneous position of the writing beam, a pilot oscillator, a first heterodyne mixer, means for supplying said color reference signal and the output of said oscillator to said mixer, means for supplying a pilot signal from the output of said mixer to said cathode ray tube, whereby to produce the index signal as a modulation product of the pilot signal and the rate of scanning in said tube, a second heterodyne mixer, means for supplying said chrominance video signal and the output of said oscillator to said second mixer, a third heterodyne mixer, means for supplying said index signal and a signal from the output of said second mixer to said third mixer, and means for supplying a signal from the output of said third mixer to said cathode ray tube to vary the intensity of said writing beam so as to produce the color image.

2. In a color television receiver adapted to receive a color television signal from which are derived a color reference signal and a chrominance video signal having the same frequency, a cathode ray tube including elements successively impinged by a writing beam to produce a color image and also including means for producing an index signal indicative of instantaneous position of the writing beam, a pilot oscillator, a first heterodyne mixer, means for supplying said color reference signal and the output of said oscillator to said mixer, filter means for selecting one of the heterodyne signals in the output of said mixer, means for supplying the selected signal to said cathode ray tube to produce the index signal as a modulation product of said selected signal and the rate of scanning in said tube, a second heterodyne mixer, means for supplying said chrominance video signal and the output of said oscillator to said second mixer, filter means for selecting in the output of said second mixer the sideband signal having a nominal frequency corresponding to the frequency of the signal selected by said first filter means, a third heterodyne mixer, means for supplying said index signal and said sideband signal to said third mixer, and means for supplying a signal from the output of said third mixer to said cathode ray tube to vary the intensity of said writing beam so as to produce the color image.

3. A television receiver according to claim 2, including a sideband amplifier for amplifying the index signal.

4. In a color television receiver employing an index-type color picture tube and also employing a pilot carrier of predetermined frequency, circuits for deriving from a received composite color television signal the color reference signal and the chrominance video signal, a pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, means for supplying the latter signal to said picture tube to produce an index signal as a sideband product of modulation within said tube, a sideband amplfier for amplfying said index signal, a second heterodyne mixer, means for supplying the chrominance video signal and the output of said oscillator to said second mixer, a third heterodyne mixer, means for supplying said index signal and a signal from the output of said second mixer to said third mixer, and means for supplying a signal from the output of said third mixer to said picture tube to produce the color image.

5. In a color television receiver employing an index-type color picture tube and also employing a pilot carrier of predetermined frequency, circuits for deriving from a received composite color television signal the color reference signal and the chrominance video signal, a pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, filter means for supplying the latter signal to said picture tube to produce an index signal as a sideband product of modulation within said tube, a sideband amplifier for amplifying said index signal, a second heterodyne mixer, means for supplying the chrominance video signal and the output of said oscillator to said second mixer, filter means for selecting in the output of said second mixer the sideband signal having a nominal frequency corresponding to said pilot carrier frequency, a third heterodyne mixer, means for supplying said index signal and the signal selected by said last filter means to said third mixer, and means for supplying a signal from the output of said third mixer to said picture tube to produce the color image.

6. In a color television receiver employing an index-type color picture tube and also employing a pilot carrier of predetermined frequency, circuits for deriving from a received composite color television signal the luminance video signal, the color reference signal and the chrominance video signal, a pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, means for supplying the latter signal to said picture tube to produce an index signal as a sideband product of modulation within said tube, a sideband amplifier for amplifying said index signal, a second heterodyne mixer, means for supplying the chrominance video signal and the output of said oscillator to said second mixer, a third heterodyne mixer, means for supplying said index signal and a signal from the output of said second mixer to said third mixer, means for adding said luminance video signal and a signal from the output of said third mixer, and means for supplying the added signals to said picture tube to produce the color image.

7. In a color television receiver employing an index-type color picture tube and also employing a pilot carrier of predetermined frequency, circuits for deriving from a received composite color television signal the luminance video signal, the color reference signal and the chrominance video signal, a pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, filter means for supplying the latter signal to said picture tube to produce an index signal as a sideband product of modulation within said tube, a sideband amplifier for amplifying said index signal, a second heterodyne mixer, means for supplying the chrominance video signal and the output of said oscillator to said second mixer, filter means for selecting in the output of said second mixer the sideband signal having a nominal frequency corresponding to said pilot carrier frequency, a third heterodyne mixer, means for supplying said index signal and the signal selected by said last filter means to said third mixer, means for adding said luminance video signal and a signal from the output of said third mixer, and means for supplying the added signals to said picture tube to produce the color image.

8. In a color television receiver, an index-type color picture tube having a writing beam and an index beam, circuits for deriving from a received composite color television signal the color reference signal and the chrominance video signal, a pilot oscillator from which is to be derived a pilot carrier of predetermined frequency for varying the intensity of said index beam, said pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, means for supplying the latter signal to said picture tube to vary the intensity of said index beam and to produce an index signal as a sideband product of modulation within said tube, a sideband amplifier for amplifying said index signal, a second heterodyne mixer, means for supplying the chrominance video signal and the output of said oscillator to said second mixer, a third heterodyne mixer, means for supplying said index signal and a signal from the output of said second mixer to said third mixer, and means for supplying a signal from the output of said third mixer to said picture tube to vary the intensity of said writing beam so as to produce the color image.

9. In a color television receiver, an index-type color picture tube having a writing beam and an index beam, circuits for deriving from a received composite color television signal the color reference signal and the chrominance video signal, a pilot oscillator from which is to be derived a pilot carrier of predetermined frequency for varying the intensity of said index beam, said pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, filter means for supplying the latter signal to said picture tube to vary the intensity of said index beam and to produce an index signal as a sideband product of modulation within said tube, a sideband amplifier for amplifying said index signal, a second heterodyne mixer, means for supplying the chrominance video signal and the output of said oscillator to said second mixer, filter means for selecting in the output of said second mixer the sideband signal having a nominal frequency corresponding to said pilot carrier frequency, a third heterodyne mixer, means for supplying said index signal and the signal selected by said last filter means to said third mixer, and means for supplying a signal from the output of said third mixer to said picture tube to vary the intensity of said writing beam so as to produce the color image.

10. In a color television receiver, an index-type color picture tube having a writing beam and an index beam, circuits for deriving from a received composite color television signal the luminance video signal, the color reference signal and the chrominance video signal, a pilot oscillator from which is to be derived a pilot carrier of predetermined frequency for varying the intensity of said index beam, said pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, means for supplying the latter signal to said picture tube to vary the intensity of said index beam and to produce an index signal as a sideband product of modulation within said tube, a sideband amplifier for amplifying said index signal, a second heterodyne mixer, means for supplying the chrominance video signal and the output of said oscillator to said second mixer, a third heterodyne mixer, means for supplying said index signal and a signal from the output of said second mixer to said third mixer, means for adding said luminance video signal and a signal from the output of said third mixer, and means for supplying the added signals to said picture tube to vary the intensity of said writing beam so as to produce the color image.

11. In a color television receiver, an index-type color picture tube having a writing beam and an index beam, circuits for deriving from a received composite color television signal the luminance video signal, the color reference signal and the chrominance video signal, a pilot oscillator from which is to be derived a pilot carrier of predetermined frequency for varying the intensity of said index beam, said pilot oscillator having an assigned frequency which differs from said pilot carrier frequency by an amount equal to the frequency of the color reference signal, a first heterodyne mixer, means for supplying the color reference signal and the output of said oscillator to said mixer, whereby a signal having the pilot carrier frequency appears in the output of said mixer, filter means for supplying the latter signal to said picture tube to vary the intensity of said index beam and to produce an index signal as a sideband product of modulation within said tube, a sideband amplifier for amplifying said index signal, a second heterodyne mixer, means for supplying the chrominance video signal and the output of said oscillator to said second mixer, filter means for selecting in the output of said second mixer the sideband signal having a nominal frequency corresponding to said pilot carrier frequency, a third heterodyne mixer, means for supplying said index signal and the signal selected by said last filter means to said third mixer, means for adding said luminance video signal and a signal from the output of said third mixer, and means for supplying the added signals to said picture tube to vary the intensity of said writing beam so as to produce the color image.

References Cited in the file of this patent

UNITED STATES PATENTS 2,742,531 Partin ---------------- Apr. 17, 1956
2,759,042 Partin ---------------- Aug. 14, 1956